United States Patent [19]

Kroon

[11] Patent Number: 4,783,810

[45] Date of Patent: Nov. 8, 1988

[54] DEVICE FOR GENERATING THE AUDIO INFORMATION OF A SET OF CHARACTERS

[75] Inventor: Johannes N. Kroon, Gemert, Netherlands

[73] Assignee: U.S. Philips Corporation, New York, N.Y.

[21] Appl. No.: 35,103

[22] Filed: Apr. 6, 1987

Related U.S. Application Data

[60] Division of Ser. No. 821,112, Jan. 17, 1986, Pat. No. 4,689,817, which is a continuation of Ser. No. 465,984, Feb. 14, 1983, abandoned.

[30] Foreign Application Priority Data

Feb. 24, 1982 [NL] Netherlands .................. 8200726

[51] Int. Cl.⁴ .............................................. G10L 5/00
[52] U.S. Cl. .................................................. 381/52
[58] Field of Search ................................ 381/51–53; 364/513.5

[56] References Cited

U.S. PATENT DOCUMENTS 3,632,887  1/1972  Leipp et al. .......................... 381/52
4,060,848  11/1977  Hyatt ...................................... 381/51

Primary Examiner—Emanuel S. Kemeny
Attorney, Agent, or Firm—Thomas A. Briody; David R. Treacy; Bernard Franzblau

[57] ABSTRACT

A device for generating the audio information of a set of characters in which some characters are intoned or pronounced with a different voice character. The device comprises means for making a distinction between a capital letter and a small letter presented. For a capital letter character, a speech pattern is formed in which the pitch or the voice character is modified, while maintaining their identity, with respect to a speech pattern for a small letter of the same character. The device also comprises means for determining the position of a letter, preferably the last letter, of a word composed of characters presented and for forming a speech pattern for the relevant letter in which the pitch and/or the voice character is modified while the identity is maintained.

17 Claims, 4 Drawing Sheets

DEVICE FOR GENERATING THE AUDIO INFORMATION OF A SET OF CHARACTERS

This is a continuation of application Ser. No. 821,112, filed Jan. 17, 1986, now U.S. Pat. No. 4,689,817, which is a continuation of application Ser. No. 465,984, filed Feb. 14, 1983, abandoned.

BACKGROUND OF THE INVENTION

This invention relates to a device for generating the audio information of a set of characters which comprises a first sub-set of small (lower case) letters and a second sub-set of upper case capital letters, said device comprising a data-processor unit to which there are connected a first memory for the storage of speech data and a second memory for the storage of characters presented thereto. The data-processor unit comprises control means for forming, on the basis of said speech data, a speech pattern for a character presented in order to control a speech generator which is connected to the first memory, said data-processor unit also comprising recognition means for recognizing from the characters presented those characters which belong to said second sub-set and for introducing a first modification in the speech pattern for the characters belonging to the second sub-set, while maintaining their identity.

A device of this kind is known from U.S. Pat. No. 4,060,848. Therein, inter alia, a calculator and a typewriter are described in which the characters presented by an operator via a keyboard connected to the device are converted into speech. The operator can thus check whether the correct information has been inputted, without taking his vision from the keyboard or from the text to be typed. The characters presented are stored in the second memory. Under the control of the data-processor unit, a speech pattern is formed on the basis of the speech data stored in the first memory for a character presented, the speech generating speech on the basis of said speech pattern. The data-processor unit comprises recognition means for distinguishing the capital letters from the other characters in the characters presented.

For a capital letter a modification is introduced in the speech pattern. This modification consists of the addition of the prefix "CAP".

It is a drawback of such a device that the addition of said prefex adversely affects the pronunciation time and hence the associated pronunciation rate. It is further drawback of such a device that all speech generated is pronounced with the same speech pattern. Due to this monotonous pronunciation, it is difficult to distinguish the individual words in a sentence.

SUMMARY OF THE INVENTION

It is an object of the invention to provide a device for generating the audio information of a set of characters in which a capital letter can be clearly distinguished from the other characters without adversely affecting the pronunciation time and the associated pronunciation rate.

To this end, a device in accordance with the invention is characterized in that the first modification consists of a modification of a pitch component and/or a voice-characterizing component of the speech pattern.

Because of the modification of a pitch component and/or a voice-characterizing component of the speech pattern for a capital letter, the capital letter can be distinctly recognized by an operator. Thus, the pronunciation time and the associated pronunciation rate are not substantially modified with respect to a speech pattern for a small letter. It is to be noted that the adaptation of the pitch is known from said U.S. Pat. No. 4,060,848. However, the pitch variation described therein is adjusted arbitrarily by the operator by means of a pitch control knob, such as is customarily used in an audio amplifier. No reference whatsoever is made to a data processor controlled pitch variation for a capital letter.

It is a further object of the invention to provide a device for generating the audio information of a set of characters in which the various words within a sentence can be clearly distinguished.

To this end, a device in accordance with the invention is characterized in that the data-processor unit comprises position determining means for determining the position of at least one letter of a word consisting of characters presented and for introducing a second modification in the speech pattern for said letter while maintaining its identity, said second modification consisting of a modification of a pitch component and/or a voice-characterizing component of the speech pattern. Because of the determination of the position of at least one letter of a word composed of characters presented and because of the modification of the speech pattern for the relevant letter, an intonation can be introduced into the relevant word so that it can be distinguished better.

A preferred embodiment of a device in accordance with the invention is characterized in that said first modification of a pitch component of the speech pattern produces a higher pitch with respect to a mean pitch component for the characters of the first sub-set.

Because of the use of a higher pitch for the pronunciation of a capital letter, such a capital letter can be distinguished better from a small letter.

A further preferred embodiment of a device in accordance with the invention is characterized in that said first modification of a pitch component of the speech pattern consists of a pitch rise within the duration of said speech pattern with respect to a mean pitch component for the characters of the first sub-set.

Due to the fact that the pitch rises for the pronunciation of a capital letter, such a capital letter can be distinguished better from small letters.

A further preferred embodiment of a device in accordance with the invention is characterized in that said first modification of the voice-characterizing component of the speech pattern consists of a shift of the formants with respect to the formant representation for the characters of the first sub-set.

The voice-characterizing component of a speech pattern for a given character contains a representation of formants, which are formed by a number of preferential frequencies. A shift in these formants, for example, towards a somewhat louder voice, for the pronunciation of a capital letter ensures that the latter can be properly distinguished from small letters.

In order to achieve a suitable distinction between the various words in a sentence, in a device in accordance with the invention said letter is preferably the last letter of a word composed of characters presented.

Preferably, said position determining means are actuable by a presented space character and/or a punctuation mark character associated with a part of a sentence. A space character and/or a punctuation mark character associated with a part of a sentence constitute distinct boundaries between two words.

A preferred embodiment of a device in accordance with the invention is characterized in that said second modification of a pitch component of the speech pattern consists of a pitch decrease within the duration of the speech pattern with respect to a mean pitch component of the speech pattern. By making the pitch decrease for the pronounciation of a last letter of a word, such a last letter can be distinguished better from the other letters of this word, so that the boundary with respect to the other words can be recognized better.

A further preferred embodiment of a device in accordance with the invention is characterized in that said second modification of a pitch component of the speech pattern consists of a lower pitch with respect to a mean pitch component of the speech pattern. Because of the use of a lower pitch for the pronunciation of the last letter of a word, such a last letter can be distinguished better from the other letters of the relevant word, so that the boundary with respect to the other words can be recognized better.

Another preferred embodiment of a device in accordance with the invention is characterized in that said second modification of the voice-characterizing component of the speech pattern consists of a shift of the formants with respect to the representation of formants of the speech pattern.

Due to a shift of the formants, for example, towards a somewhat softer voice, for the pronunciation of a last letter of a word, such a word can be suitably distinguished from the other words in the sentence.

Preferably, the modification of the pitch component is within a range of from ¼ to 1.5 octaves. Within a range of from ¼ to 1.5 octaves, pitch variations can be clearly distinguished by the human ear.

BRIEF DESCRIPTION OF THE DRAWINGS

The invention will be described further, by way of example, with reference to the drawing wherein.

DESCRIPTION OF THE PREFERRED EMBODIMENTS

Figure 1:
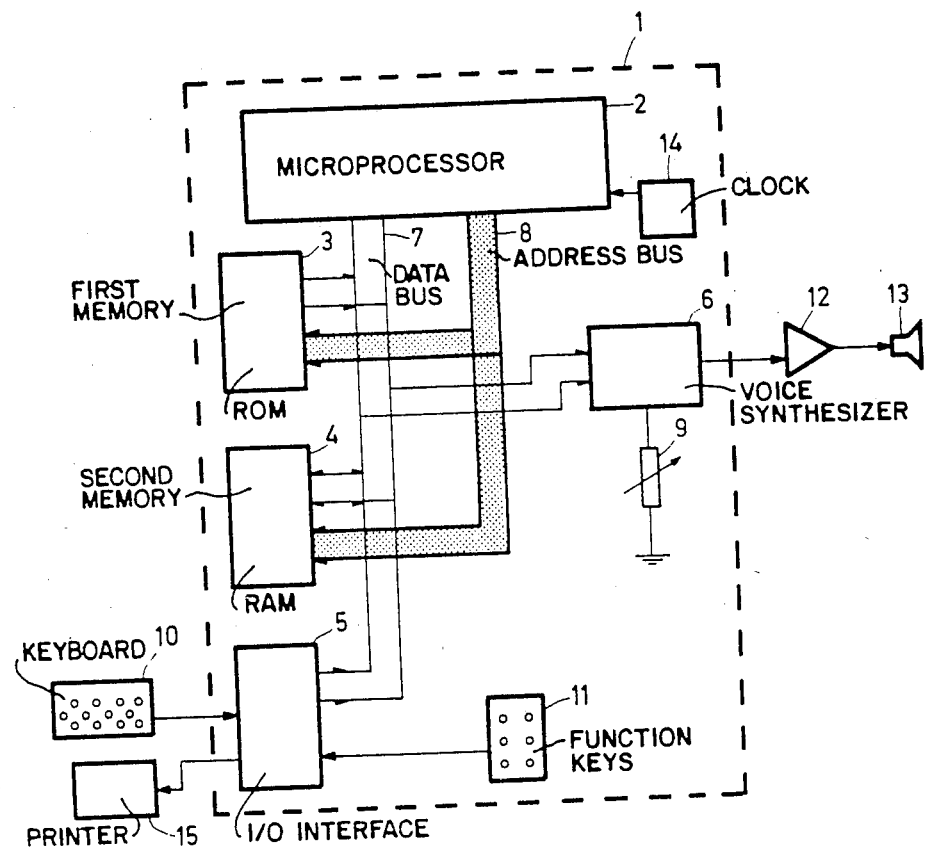
FIG. 1 shows a block diagram of an embodiment of a device in accordance with the invention.

FIG. 1 shows a block diagram of an embodiment of a device in accordance with the invention. The device 1 comprises a microprocessor 2 with a data bus 7, an address bus 8 and a clock 14 which are connected thereto. The microprocessor generates control signals for the elements of the device and processes the signals originating therefrom. The microprocessor furthermore selects and prepares speech data for a voice synthesizer chip 6. A first memory 3 ((P)ROM) and a second memory 4 (RAM) are connected to the data bus and to the address bus. The first memory 3 serves for the storage of programs to be used by the microprocessor and also for the storage of speech data. Several kinds of alphabets can be stored in the first memory, for example, a phonetic alphabet (aa, be, etc.), phonemes, and possibly also an alphabet code (Anna, Bernard, etc). The second memory 4 serves inter alia for the storage of information which is presented via an input/output interface 5. The input/output interface comprises a connection for a keyboard (10) and a printer (15) or a commercially available typewriter comprising a data connector. The information of a depressed key (for example, an ASCII character) is presented to the input/output interface in serial form in this embodiment. After each character is received, an interrupt signal is applied to the microprocessor 2. The device 1 further comprises a number of function keys 11 which are connected to the input/output interface 5. Communication between these function keys and the microprocessor is also performed on an interrupt basis in this embodiment. These function keys offer the operator given facilities. These facilities concern inter alia:

a trial/type key. This key can be used by a visually handicapped typist who is searching for a given key. In its activated condition, this key ensures that the activated character is pronounced instead of being stored in the second memory 4.

a speech on/off key which enables the operator to suppress the speech when the operator does not wish to hear the speech.

a character/word/line selector which enables reproduction of the speech either per character, or per complete word or per complete line.

a repeat key which does not change the position of the cursor.

a forward/backward key by means of which the operator can change the position of the cursor.

an alphabet selector key for said alphabet selection. This key prevents access to the addresses of the first memory in which the non-selected alphabets are stored.

speech rate key for controlling the speech rate. The volume of the speech reproduction is controlled by means of a known potentiometer 9. An output of the voice synthesiser chip 6 is connected to a connector for an amplifier 12 and a loudspeaker or headphone 13. The latter connector can also be connected to a telephone line so that the device can also be used as a communication means for speech-impaired persons.

After adjustment of an initial value for the fundamental tone, that is to say approximately 100-150 Hz for a male voice and approximately 200-300 Hz for a female voice, the voice synthesizer chip 6 (PHILIPS MEA 8000) generates a speech frame from, for example, 32 bits of speech data. The fundamental tone is to be understood to mean herein the lowest frequency component occuring in the periodic signal used to form the speech. The selection of this initial value is performed by means of a known tone control knob such as is customarily found, for example, on an audio amplifier. The frequency of the fundamental tone is laid down in the speech data of the successive speech frames. The mean pitch is based on this fundamental tone. The duration of such a speech frame is determined by the speech data itself and amounts to, for example, 8, 16, 32 or 64 milliseconds. The speech rate may vary from approximately 1 to 15 characters per second so that it has hardly any effect on a given typing speed to be reached. Moreover, for each new actuation of a key the running speech is interrupted so that the period of time between two actuations is not restricted by the duration of the speech responses. Interruption is realized by the interrupt signal which is generated each time a key is actuated.

Figure 2:
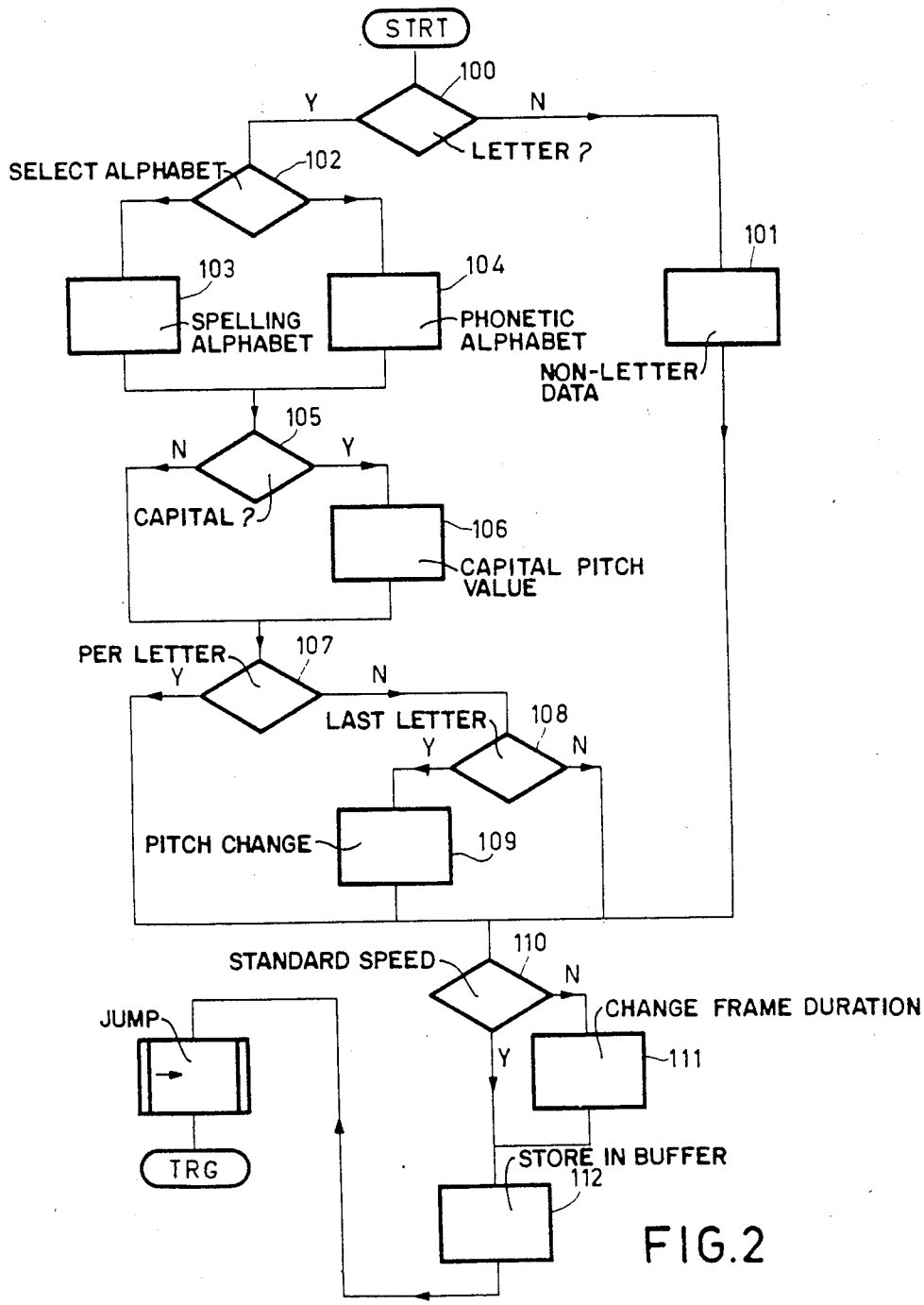
FIG. 2 shows a flow chart of a speech preparation program, FIG. 3 shown a flow chart of a command sub-program.

FIG. 2 shows a flow chart of a program for the preparation of speech data, said program being referred to as the preparation program. A diamond in the Figure indicates a test step, while a rectangle indicates an execution step. These speech data are generated by the fetching of speech information from the first memory for supply to the voice synthesizer chip which in turn outputs speech signals to the connected reproduction device for audio reproduction. The speech data is prepared by way of name codes which are supplied by sub-programs which will be described hereinafter. In these name codes a distinction is made first of all between letters on the one hand and non-letters (100) on the other hand. For "non-letters" (101) the speech data are fetched from a speech table stored in the first memory. When the information presented represents a letter, the position of the alphabet selector key (102), if included in the device, is read during a next step of the program. Depending on the position of the alphabet selector key, the speech data associated with the letter presented is fetched from the associated table which is stored in the first memory. For the purpose of illustration, the Figure shows a selection between a spelling alphabet (103) and a phonetic alphabet (104). During a next program step it is tested whether the letter presented is a capital letter or a small letter (105). When use is made of the ASCII code, the code of the character itself reveals whether a capital letter or a small letter is concerned. In the case of a capital letter (106), the start pitch value of the fundamental tone is changed, so that this letter is formed as speech having a higher pitch with respect to the mean value. A higher pitch with respect to the mean value is to be understood to mean, for this example, that the higher pitch is of from ¼ to 1.5 octaves above the mean value. During a next program step (107) it is tested whether the operator has selected prononciation per letter, per word or per line. When the operator has selected pronounciation per letter, the letter is pronounced with the standard fundamental tone with the higher fundamental tone for capital letters. When the operator has selected pronounciation per word or per line, it is tested during the next program step (108) whether the last letter of a word is concerned. The information "last letter" is supplied by the command sub-program to be described hereinafter. When the letter presented is not the last letter, the letter is pronounced with the standard pitch and the initial value of the fundamental tone remains the same. When the last letter of a word is concerned (109), the pitch increment is adapted for each speech frame so that the latter letter becomes audible as speech with a decreasing pitch. A decreasing pitch with respect to a mean value is to be understood to mean, for this example, that the pitch decrease is in a range of from ¼ to 1.5 octaves per letter pronounced. Evidently, this choice where a capital letter is pronounced with a higher pitch and the last letter of a word is pronounced with a decreasing pitch represents merely one embodiment to which the invention is by no means restricted. The invention also concerns any variation thereof, for example, an increasing pitch for a capital letter and a decreasing pitch for a last letter.

During the next program step (110) it is checked whether the speech data fetched from the appropriate table in the first memory is to be pronounced at a speed other than the standard speed. This standard speed is, for example, three characters per second. Instead of the selected standard speed, the speech rate can be varied, for example, from 1 to 15 characters per second. When the speed setting deviates from the standard speed, the frame duration must be adapted for each speech frame (111). Subsequently, the processed speech data are successively stored in a speech buffer, which is the last step (112) of the program. The speech data are pronounced on the basis of a speech program. This speech program ensures that the speech buffer in the voice synthesiser chip is loaded at the appropriate instant. The period of time between the successive presentation of the speech data depends on the duration of the speech frame. Loading is controlled by commands, for example, on the basis of voice synthesizer chip interrupts.

As has already been stated with reference to FIG. 2, the preparation of the speech commands is performed by means of codes provided by sub-programs. There are notably two sub-programs, i.e. a command sub-program and a type sub-program.

Figure 3:
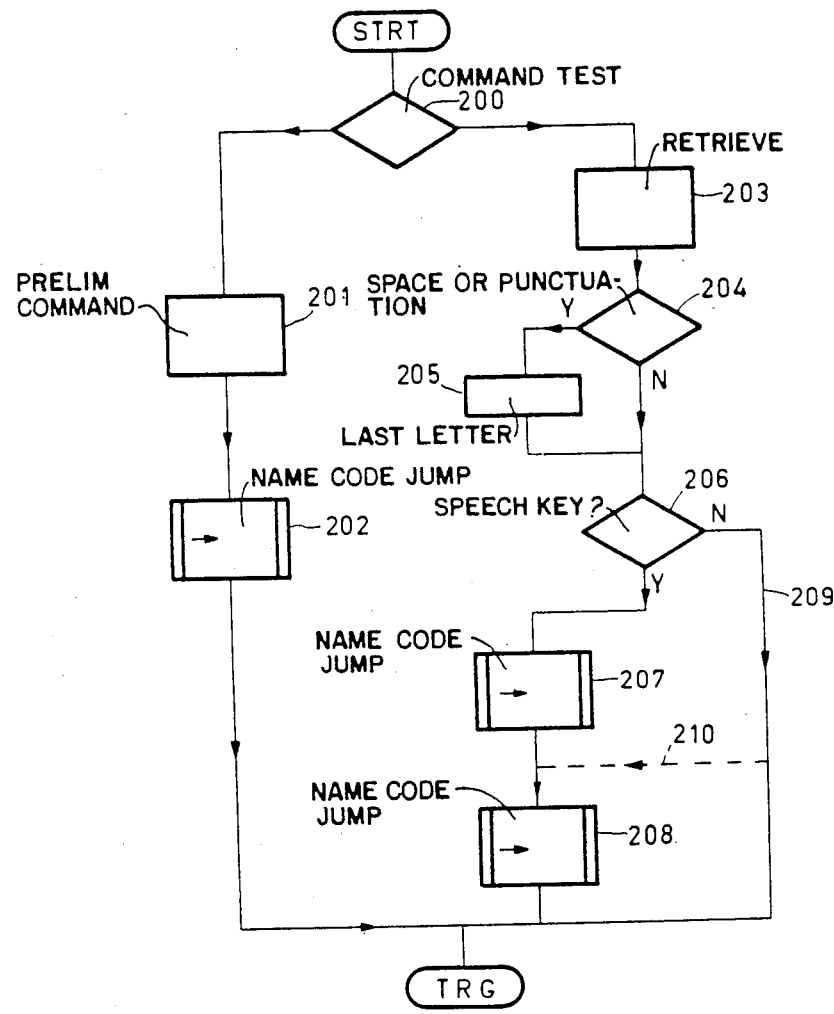

FIG. 3 shows a flow chart for a command subprogram. During the first step (200) of the command subprogram the nature of the command is tested. The commands themselves are issued by depression of the described function keys or of the keys of a connected keyboard. Two kinds of commands are distinguished, that is to say preliminary commands such as, for example, alphabet selection and speech rate, and operational commands, for example, "repeat word". For a preliminary command the setting is changed (201) as desired, after which a jump (202) is made to the preparation program by way of the name code of the new setting. (A rectangle comprising double vertical sides indicates the jump to a different program). The changing of the setting means, for example, that when a phonetic alphabet is selected (indicated by the alphabet keys), only the section in which the phonetic alphabet is stored in the first memory can be addressed. For an operational command one or more characters are successively fetched from the second memory (203). During the next subprogram step (204) it is tested whether the character presented is a space character or perhaps a punctuation mark. A punctuation mark is to be understood to mean all marks which directly follow a complete word, for example, a comma, a full stop, a question mark, an exclamation mark, a colon and a semicolon. When the character is a space character or a punctuation mark (205), the preceding character is the last letter. As has already been stated, this information is important for the preparation program. Subsequently, the position of the speech key is requested (206). When the speech key is in the position "on", the name codes of the operation name (207) and of the characters fetched (208) are transferred to the preparation program. When the speech key is in the position "off" (209), the preparation program is not addressed. However, notably for visually handicapped persons it may be advantageous to obtain spoken information concerning the result of an instruction given, without it being necessary to listen to the other characters typed. To this end there may be a special step (210, 208) during which only the result of the executed instruction is pronounced, even when the speech is "off". For example, in the case of an instruction "repeat letter", only the relevant letter is pronounced.

Figure 4:
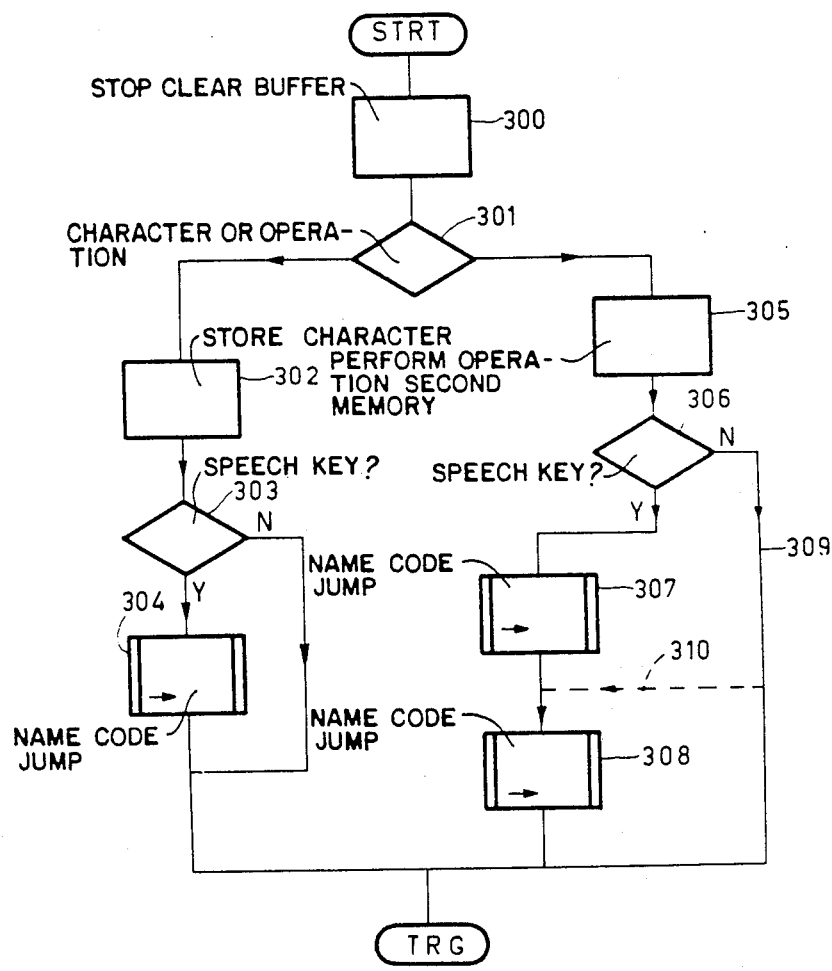
FIG. 4 shows a flow chart of a type sub-program.

FIG. 4 shows a flow chart for a type sub-program. This sub-program is addressed after the reception of a signal, for example, in the ASCII code, from a connected keyboard or typewriter. During the first step (300) of the type sub-program, the speech reproduction is stopped by application of a stop command to the voice synthesizer chip and the vacating of the speech buffer. During a next step (301), it is tested whether the signal presented is a character, for example, a letter, or a text operation, for example, a correction. When the signal presented is a character, the character is stored in the second memory (302). Subsequently (303), the position of the speech key is requested. When the speech is "on", the name code of the character is applied to the preparation program (304). When the speech is "off", the preparation program is not addressed. When the signal presented constitutes a text operation, this operation is performed in the second memory (305). Subsequently (306), the position of the speech key is requested. When the speech is "on", the name code of the operation and that of the result are applied to the preparation program (307 +308). When the speech is "off" (309), the preparation program is not addressed. However, for some text operations performed by visually handicapped persons it may be attractive to provide a spoken, confirmation of the text operation performed. For example, when the text operation concerns a correction, it is attractive to hear which letter has been corrected without it being necessary to listen to all other letters typed. For such an implementation, a jump (310) can be made to the preparation program even when the speech is "off", the result of the operation (308), for example, the corrected letter, then being transferred to the preparation program.

The variation of the pitch in order to make a distinction between capital letters on the one hand and small letters and on the other hand and between last letters and the other letters of a word, of course, represent only two of a variety of possibilities. A further possibility of making this distinction is the modification of the voice character. This is realized in the same way as described in the preparation program. The voice character is changed by performing an operation on the formants, which are the preferred frequencies during speech. A speech pattern usually comprises a number of formants, for example, four. One bandwidth is customarily associated with each of these frequencies. A variation of the voice character is realized by shifting one or more of these frequencies with respect to the mean value so that a higher or lower frequency is obtained.

What is claimed is:

1. A device for generating the audio information of a set of characters which includes a first sub-set of lower case letters and a second sub-set of upper case capital letters, said device comprising, a data-processor unit connected to a first memory for the storage of speech data and to a second memory for the storage of external input characters presented thereto, said data-processor unit comprising control means for forming, on the basis of said speech data in the first memory, a speech pattern corresponding to said input characters presented, a speech generator connected to the first memory and controlled by the data processor control means, said data processor unit further comprising character recognition means for recognizing from the input characters presented those characters which belong to said second sub-set and for introducing a modification in the speech pattern for the characters belonging to the second sub-set, wherein the modification comprises a modification of a pitch component and/or a voice-characterizing component of the speech pattern while maintaining the identity of the second sub-set of letters.

2. A device for generating the audio information of a set of characters comprising, a data-processor unit connected to a first memory for the storage of speech data and to a second memory for the storage of external input characters presented thereto, said data-processor unit comprising control means for forming, on the basis of said speech data in the first memory, a speech pattern corresponding to said input characters presented, a speech generator connected to the first memory and controlled by the data processor control means, wherein the data-processor unit comprises position determining means for determining the position of at least one letter of a word made up of characters presented and for introducing a modification in the speech pattern for said letter while maintaining its identity, said modification comprising a modification of a pitch component and/or a voice-characterizing component of the speech pattern.

3. A device as claimed in claim 1, wherein the data-processor unit further comprises position determining means for determining the position of at least one letter of a word consisting made up of characters presented and for introducing a second modification in the speech pattern for said letter while maintaining the its identity, said second modification comprising a modification of a pitch component and/or a voice-characterizing component of the speech pattern.

4. A device as claimed in claims 1 or 2, wherein said modification of a pitch component of the speech pattern produces a higher pitch with respect to a mean pitch component for the characters of the first sub-set.

5. A device as claimed in claims 1 or 3, wherein the first modification of a pitch component of the speech pattern comprises a pitch rise within the duration of said speech pattern with respect to a mean pitch component for the characters of the first sub-set.

6. A device as claimed in claims 1 or 3, wherein the first modification of the voice-characterizing component of the speech pattern comprises a shift of the formants with respect to the formant representation for the characters of the first sub-set.

7. A device as claimed in claims 2 or 3, wherein said one letter is the last letter of a word composed of characters presented.

8. A device as claimed in claims 2 or 3 wherein said position determining means are actuable by a presented space character and/or a punctuation mark character associated with a part of a sentence.

9. A device as claimed in claim 3, wherein said second modification of a pitch component of the speech pattern comprises a pitch decrease within the duration of the speech pattern with respect to a mean pitch component of the speech pattern.

10. A device as claimed in claim 3, wherein said second modification of a pitch component of the speech pattern comprises a lower pitch with respect to a mean pitch component of the speech pattern.

11. A device as claimed in claim 3, wherein said second modification of the voice-characterizing component of the speech pattern comprises a shift of the formants with respect to the representation of formants of the speech pattern.

12. A device as claimed in claim 4, wherein the modification of the pitch component is within a range of from ¼ to 1.5 octaves.

13. A typewriter comprising a keyboard having an output connected to a device as claimed in claims 1, 2 or 3.

14. A device as claimed in claim 5 wherein the modification of the pitch component is within a range of from ¼ to 1.5 octaves.

15. A device as claimed in claim 9 wherein the modification of the pitch component is within a range of from ¼ to 1.5 octaves.

16. A device as claimed in claim 2, wherein said modification of a pitch component of the speech pattern comprises a lower pitch with respect to a mean pitch component of the speech pattern.

17. A device as claimed in claim 2, wherein said modification of the voice-characterizing component of the speech pattern comprises a shift of the formants with respect to the representation of formants of the speech pattern.

* * * * *